(12) United States Patent
VanEe

(10) Patent No.: US 6,511,374 B2
(45) Date of Patent: Jan. 28, 2003

(54) HUB AND BLADE ASSEMBLY FOR AN AGRICULTURAL COMBINE RESIDUE HANDLING SYSTEM

(75) Inventor: Marvin VanEe, Eldridge, IA (US)

(73) Assignee: Case Corporation, Racine, WI (US)

( * ) Notice: Subject to any disclaimer, the term of this patent is extended or adjusted under 35 U.S.C. 154(b) by 4 days.

(21) Appl. No.: 09/776,091

(22) Filed: Feb. 2, 2001

(65) Prior Publication Data

US 2002/0107056 A1 Aug. 8, 2002

(51) Int. Cl.$^7$ ................................................. A01F 12/40
(52) U.S. Cl. ........................................ 460/112; 56/500
(58) Field of Search ................................. 460/111, 112; 241/243; 56/500, 504, 505, 294

(56) References Cited

U.S. PATENT DOCUMENTS

| | | | |
|---|---|---|---|
| 1,758,445 A | 5/1930 | Kay | |
| 2,081,807 A | 5/1937 | Gabriel | |
| 2,386,729 A | * 10/1945 | Watter | ........................ 411/338 |
| 2,990,667 A | 7/1961 | Schwalm | |
| 3,214,897 A | 11/1965 | Phares | |
| 3,309,854 A | 3/1967 | Mitchell et al. | |
| 3,397,525 A | * 8/1968 | Woodring | .................... 56/294 |
| 3,423,920 A | * 1/1969 | Woodring et al. | ............. 56/294 |
| 3,465,507 A | * 9/1969 | Fishaw | ......................... 56/294 |
| 3,477,214 A | * 11/1969 | Rogers | ......................... 56/295 |
| 3,604,188 A | * 9/1971 | Mott | ............................. 56/294 |
| 3,690,359 A | * 9/1972 | Wenzel et al. | ......... 241/101.742 |
| 3,693,335 A | * 9/1972 | Mathews | ...................... 56/294 |
| 3,786,996 A | 1/1974 | Richter | |
| 4,292,795 A | * 10/1981 | Linn | ............................. 56/503 |
| 4,612,941 A | * 9/1986 | Kunde | .......................... 460/112 |
| 5,042,973 A | 8/1991 | Hammarstrani | |
| 5,205,667 A | * 4/1993 | Montgomery, Sr. | .......... 403/151 |
| 5,232,405 A | 8/1993 | Redekop et al. | |
| 5,272,861 A | * 12/1993 | Roynberg | ..................... 56/504 |
| 5,482,508 A | 1/1996 | Redekop et al. | |
| 5,673,545 A | * 10/1997 | Friesen | ......................... 56/255 |

FOREIGN PATENT DOCUMENTS

AT 215733 11/1960

* cited by examiner

*Primary Examiner*—Robert E. Pezzuto
*Assistant Examiner*—Árpád Fábián Kovács

(57) ABSTRACT

A residue handling system for an agricultural combine including a residue chopper that provides enhanced air flow for evenly distributing crop materials onto a crop field. A hub and blade assembly accurately positions flail blades and resists fatigue stresses. Each flail blade includes an outer portion that is angled longitudinally away from a plane transverse to the axis of rotation. In a mated blade pair embodiment, the leading edges of the paired flail blades may be closer to each other than the trailing edges, or vice versa. Also, the leading edges of the flail blade pair may be the same distance away as the trailing edges of the pair, beneficially directing discharge sideways in a preferred common direction. The assembly includes a mounting support post that has a width substantially equal to the distance between two mated blades. The mated blades are installed directly against the sides of the mounting support, without spacer bushings, using only three connector elements.

10 Claims, 5 Drawing Sheets

FIG.4
FIG.5
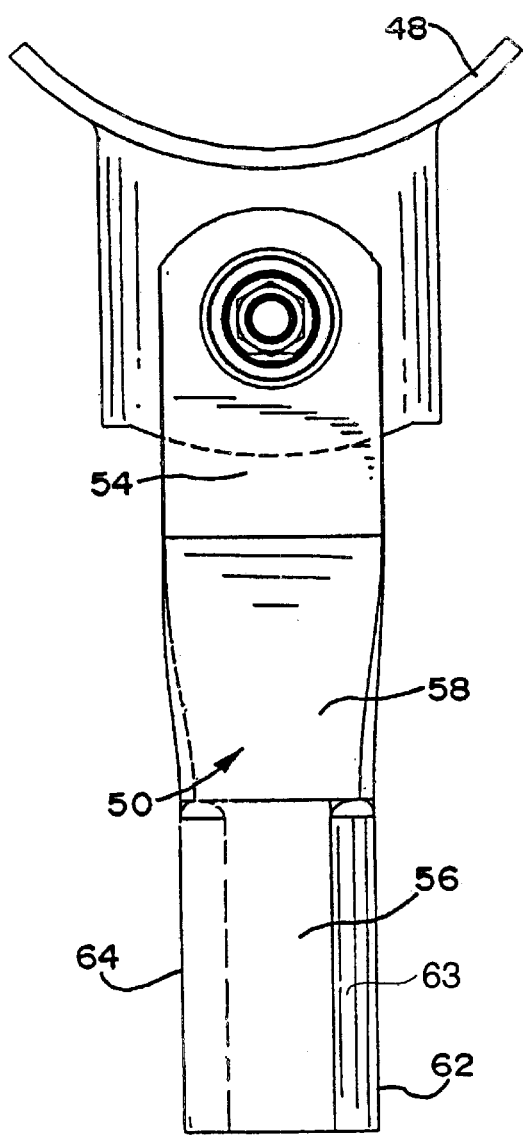
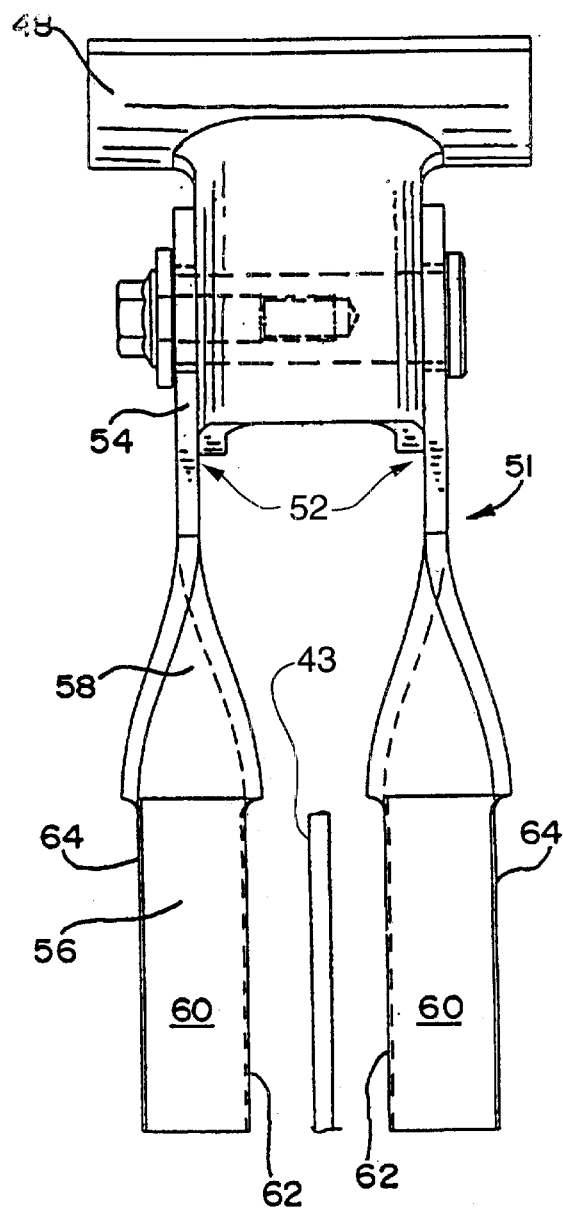

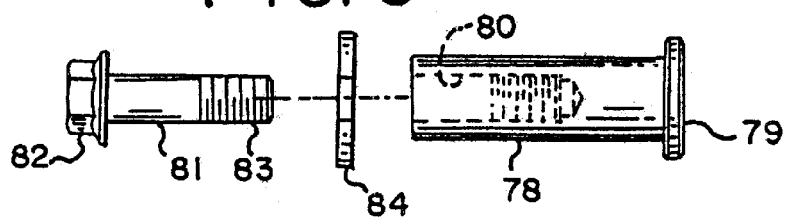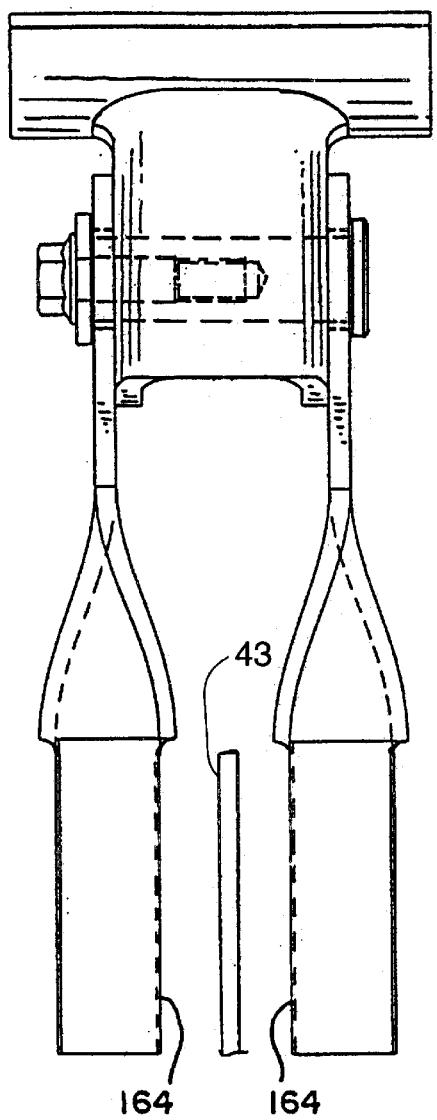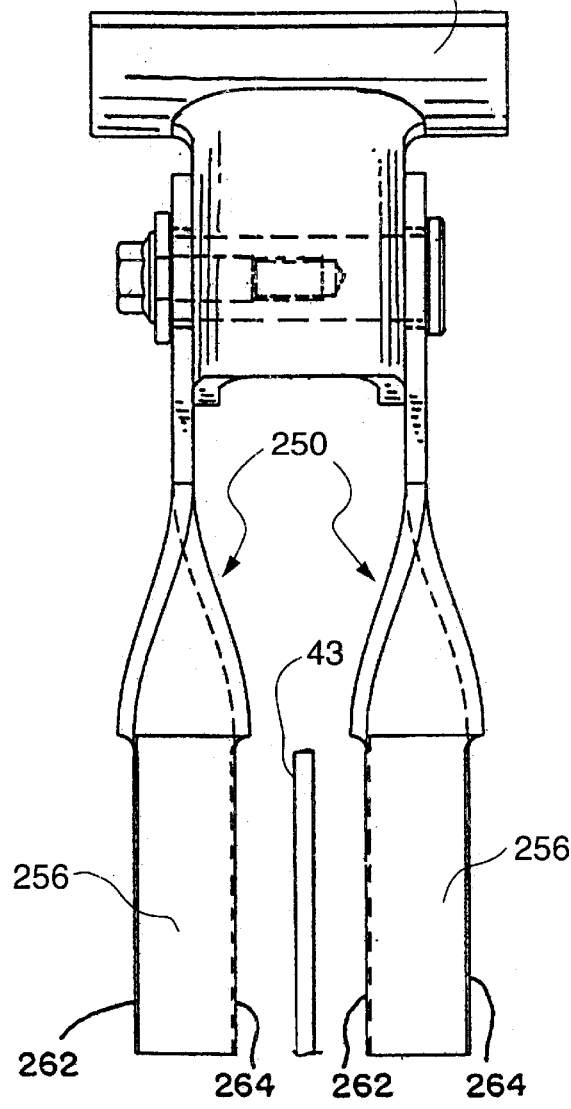

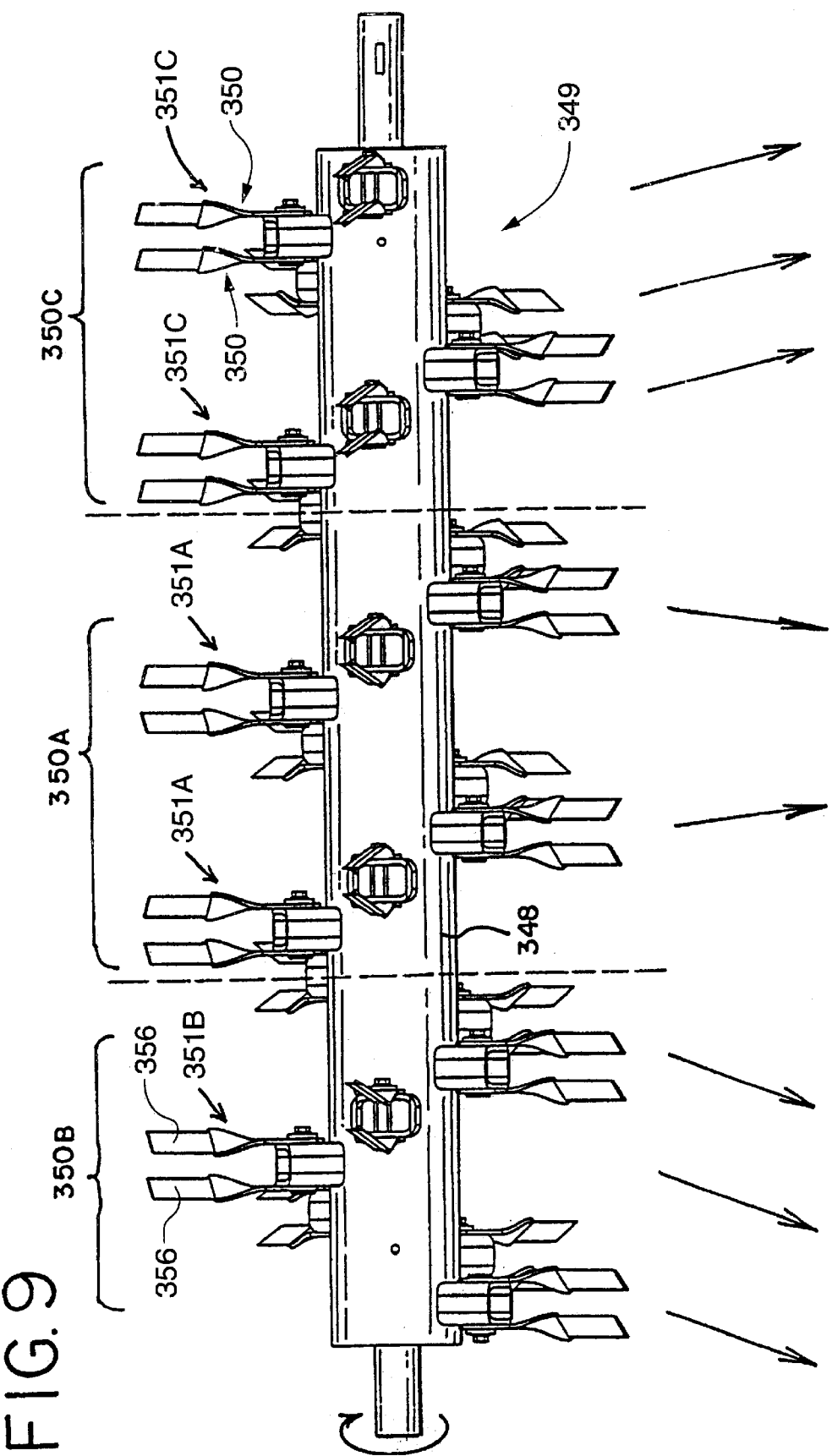

US 6,511,374 B2

HUB AND BLADE ASSEMBLY FOR AN AGRICULTURAL COMBINE RESIDUE HANDLING SYSTEM

FIELD OF THE INVENTION

This invention relates generally to an agricultural combine. It relates particularly to a residue handling system for an agricultural combine.

BACKGROUND OF THE INVENTION

Agricultural combines are well-known machines for harvesting crop materials. They are available in various forms but all perform the basic functions of reaping crop materials from a field, separating grain from non-grain crop materials, and discarding the non-grain materials in the field.

A typical combine includes a crop harvesting or header assembly which reaps ripened crop plants from the crop field and a feeder assembly which feeds the crop materials to a threshing assembly. One type of combine incorporates a rotary threshing assembly. In such a combine, the crop materials are introduced to the front end of the rotary threshing assembly, which is oriented longitudinally, or axially, within the combine body. The crop materials are then threshed between a rotating rotor, which includes rasp bars along its exterior, and the inside of a rotor cylinder. Along the bottom of the rotor cylinder concaves are mounted that allow grain heads and other fine materials to pass through while retaining the crop stalks within the rotor cylinder.

The rotary threshing assembly includes mechanisms for feeding the crop materials rearwardly through the rotor assembly so that the crop stalks and other materials which do not pass through the concaves are discharged out the rear end of the assembly. The grain heads and other fine materials pass through the concaves onto a series of sieves that separate the grain from the unwanted fine materials. A cleaning fan directs air flow through the sieves to assist in the separation operation. After separation, the grain is conveyed to a grain bin through an auger system and the unwanted fine materials are discharged from the rear end of the sieves.

Modern farming practices require that the unwanted crop stalks be chopped up, mixed with fine materials, and evenly spread across the crop field. This is especially true with no-till farming, but is also important for more traditional farming techniques.

The demand for greater productivity has resulted in larger header assemblies, which harvest wider swaths in the crop field, and increased travelling speeds of the combine across the crop field. This has led to a need for more effective distribution systems for the non-grain crop materials.

A common type of non-grain or residue distribution system includes a residue chopper. The residue chopper is typically located in the rear of the combine body. Some types of residue choppers receive and distribute only crop stalks from the rotor assembly. Other types receive and distribute both crop stalks and fine materials from the sieves.

The residue chopper is oriented transversely of the combine and includes a plurality of flail blades which chop and mix the crop materials. The flail blades are pivotally connected to supports on a rotating hub. Normally, two flail blades are attached to each support, with one on each side of the support. In most prior art systems the two flail blades are spaced from the mounting support with spacer bushings. However, with such a construction, the mounting flange can become weak from continuously applied stresses and eventually break, causing unwanted downtime and repair costs. Additionally, use of these spacer bushings does not permit accurate positioning of the flail blades.

Air flow through the residue chopper greatly influences the effectiveness of the chopper in mixing the crop materials and distributing them from the rear of the combine. Vanes located at the exit of the residue chopper sweep in an outward direction to spread the crop materials across the crop field. Optimally, the crop materials will be discharged evenly in a swath which is the same width as the combine header assembly. However, because combine header assemblies can be as wide as thirty feet and more, the crop materials must exit the residue chopper at a high velocity in order to be directed across a wide swath. This necessitates a large volume of air flow through the residue chopper to achieve the desired exit velocity.

In residue choppers which receive both crop materials from the threshing assembly cylinder and fine materials from the sieves, it is a common practice to direct the cleaning fan air through the residue chopper. In this arrangement, the residue chopper housing becomes the primary path for the cleaning air, and the cleaning fan becomes the primary source of air flow through the residue chopper. The design and shape of the residue chopper's flail blades is important in ensuring adequate air flow through the chopper. Some known flail blades inhibit air flow through the residue chopper and actually create back pressure that partially prevents the cleaning fan air flow from entering the chopper. This not only adversely affects exit velocity of the crop materials but also reduces the effectiveness of the cleaning fan in separating the grain from the non-grain fine and light materials.

BRIEF SUMMARY OF THE INVENTION

It is a primary object of the invention to provide an improved residue chopper in a rotary combine.

It is also an object of the invention to provide an improved flail blade which assists the cleaning fan in moving air through the residue chopper.

It is another object to provide an improved flail blade which increases air flow through a residue chopper.

It is still another object to provide a flail blade which is configured intermediate its ends so that the front surface of the blade is inclined from the direction of blade travel in the chopper.

It is a further object of the invention to provide a mounting arrangement for the flail blades on a hub which includes a hollow mounting support having a width equal to the desired space between the inner ends of mated flail blades.

It is still a further object to provide a flail blade mounting arrangement which better resists fatigue stresses while providing more accurate flail blade positioning.

It is yet a further object to provide an improved hub and blade assembly in a residue chopper for a rotary combine.

It is yet another object to provide an improved hub and flail blade assembly including a pattern of flail blades which provides optimum residue distribution.

According to the invention, each flail blade is pivotally connected to a rotatable hub in a hub and blade assembly. An inner portion of the flail blade is flat and lies in a plane perpendicular to the axis of rotation of the hub. An outer portion of the blade is also flat, but is inclined from that plane. Thus, the front surface of the outer portion of the blade is inclined at an angle to the plane of rotation of the blade. As the blade rotates during operation of the chopper, this angled front surface increases the flow of air through the chopper housing by moving air ahead of it.

In a mated blade arrangement, two blades are attached to a single mounting support. In a first form of mated blade arrangement, the outer portions of the blades are angled in opposite directions so that the leading edges of the outer portions of two flail blades are closer to each other than the trailing edges. What amounts to a V-shaped pocket is formed behind the blades as they rotate. In a second form of mated blade arrangement, the trailing edges of the outer portions of mated blades are closer to each other than the trailing edges, creating a V-shaped pocket in front of the blades. In a third form of mated blade arrangement, the leading and trailing edges are equidistant from each other. A fixed knife attached to the housing passes between the leading edges of the mated blades when the hub rotates, producing a scissors cutting action to chop-up crop materials.

According to the invention, different forms of mated blade arrangements may be mounted on the same hub to create a pattern in the hub and blade assembly which produces a desired pattern of residue blown from the chopper. A hub and blade assembly may be effectively divided into three sections: a center section having the first and/or second form of blade arrangements thereon; a left section having the third form of blade arrangements thereon with the outer blade portions inclined so as to direct residue to the left as well as rearwardly; and, a right section having the third form of blade arrangements thereon with outer blade portions inclined so as to direct residue to the right as well as rearwardly.

The mounting support for each blade or mated pair of blades includes a rectangular cross-section post. The mounting support post has front, back, and side walls. The width of the post is substantially the same as the desired distance between the parallel inner portions of two mated flail blades, Therefore, the side surfaces of the inner portions on the flail blades directly contact the side walls of the mounting support post, without the need for spacer bushings. The flail blades can be pivotally mounted on the support post using only three mounting elements and a wrench.

BRIEF DESCRIPTION OF SEVERAL VIEWS OF THE DRAWINGS

The invention, including its construction and method of operation, is illustrated more or less diagrammatically in the drawings, in which:

FIG. 4 is a side elevational view of the hub and blade assembly the straw chopper of FIG. 2 with parts removed;

FIG. 5 is front elevational view of the hub and blade assembly seen in FIG. 4;

FIG. 6 is an exploded view of the blade mounting elements for the blades seen in FIGS. 4 and 5;

FIG. 7 is a front elevational view of a second form of hub and blade assembly for the straw chopper;

FIG. 8 is a front elevational view of a third form of hub and blade assembly for the straw chopper; and FIG. 9 is a top plan view of a modified hub and blade assembly for the straw chopper of the invention.

DETAILED DESCRIPTION OF THE INVENTION

Figure 1:
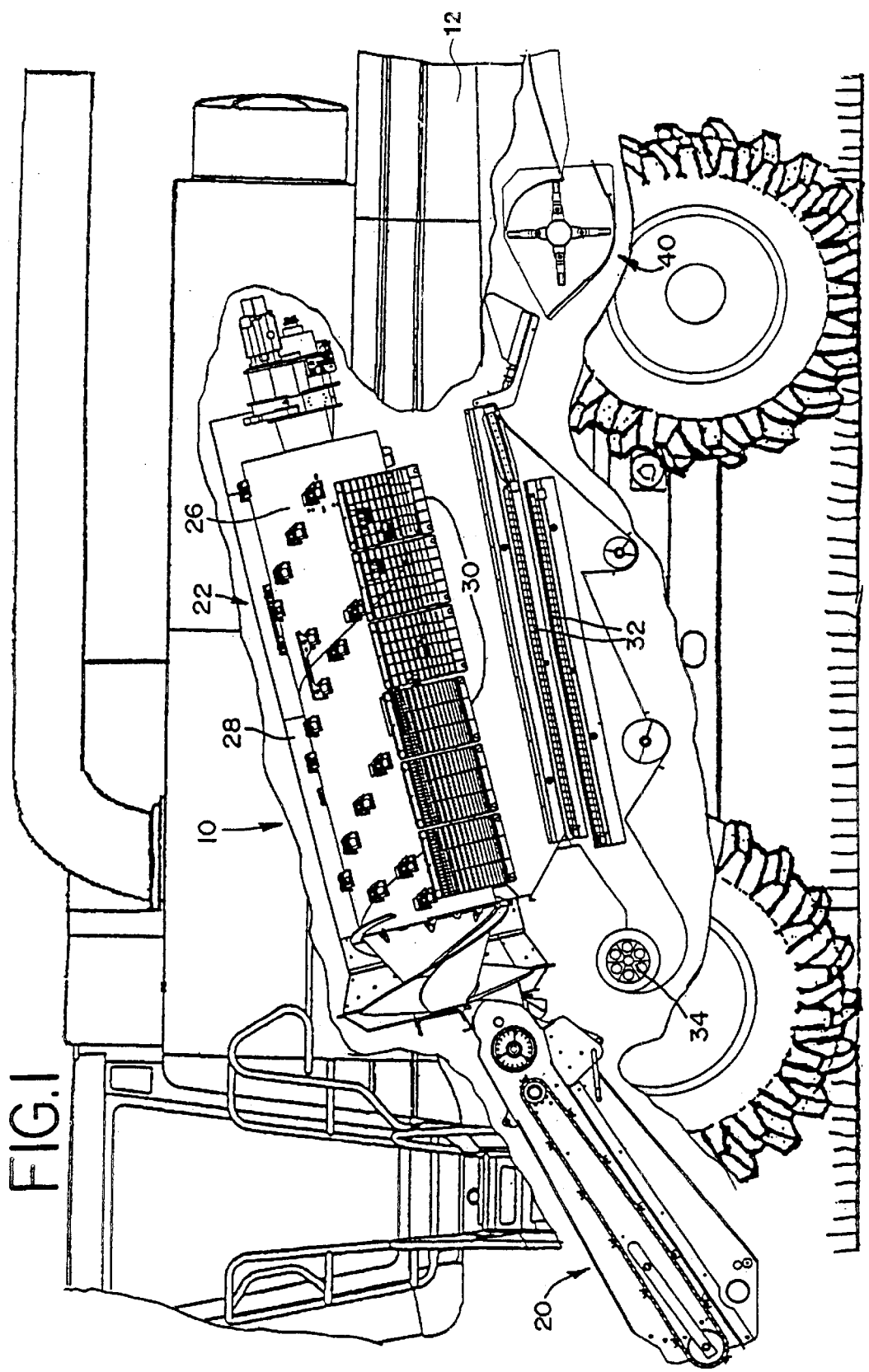
FIG. 1 is a side elevational view of a portion of a rotary agricultural combine, with parts of the combine removed to display internal components.

Referring to the drawings, and particularly to FIG. 1, a portion of a rotary combine is shown generally at 10. The combine portion 10 includes a feeder assembly 20 and a rotary threshing assembly 22. The rotary threshing assembly 22 includes a rotor 26 and a rotor housing 28. Crop materials travel rearwardly through the rotary threshing assembly 22 and are threshed by a series of threshing elements attached to the exterior of the rotor 26.

Along the bottom side of the rotor housing 28 are perforated concaves 30 which allow grain heads and other fine materials to pass through, and out of, the rotary threshing assembly 22. Larger material pieces such as crop stalks continue rearwardly through and are discharged out the rear end of the rotary threshing assembly 22.

The grain heads and other fine materials are directed to a series of sieves 32. A drive mechanism (not shown) effects a constant back and forth motion between the sieves 32. As the crop materials pass through the sieves 32, they further separate the grain from the unwanted chaff and fine and light materials. A cleaning fan 34 located forward of the sieves 32 blows air rearwardly through the sieves, thus helping to separate the grain from the fine and light materials. The cleaning fan 34 air also drives the unwanted fine and light materials out the rear end of the sieves 32.

The distribution of unwanted crop materials onto the cleared field as the combine 10 travels across the field is effected by a residue chopper 40 embodying features of he invention. The chopper 40 chops the crop stalks into a finer residue material, mixes the chopped crop stalks with the chaff fine materials, and distributes the mixed residue evenly across the crop field. The residue chopper 40 is oriented transversely of the combine to the rear of the threshing assembly 22.

Figure 2:
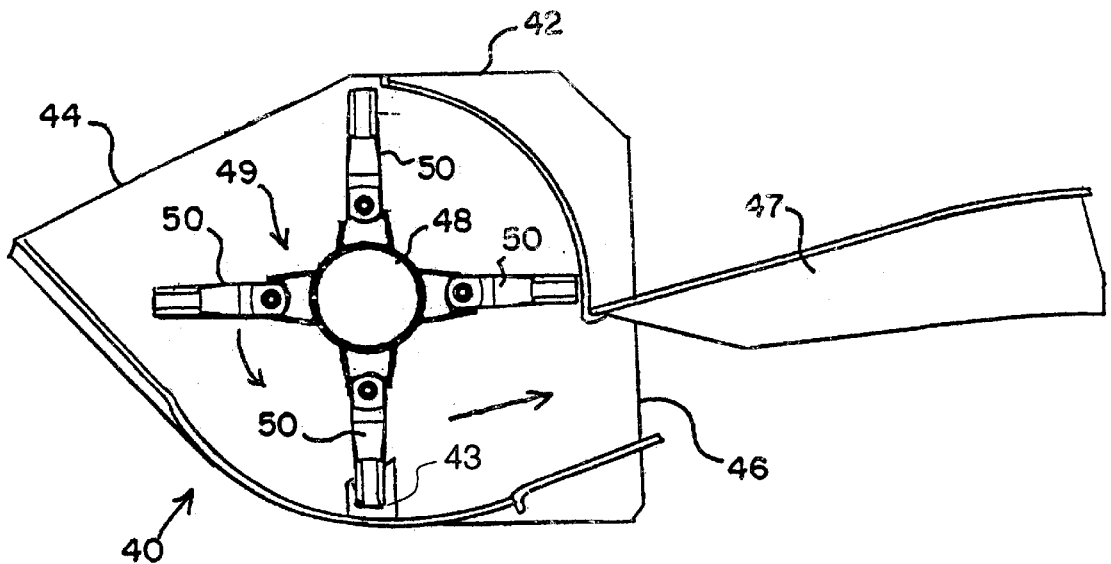
FIG. 2 is a vertical sectional view through a straw chopper embodying features of the invention.

Referring now to FIG. 2, the residue chopper 40 includes housing 42 mounted in the combine body 12 and elongated transversely of the body. The housing 42 encloses a rotatable hub and blade assembly 49, including a hub 48 to which flail blades 50 are pivotally attached, preferably in mated pairs. The hub and blade assembly 49 is viewed from one end of FIG. 2, which shows it rotating in a counter-clockwise direction.

The housing 42 has front entrance 44 through which both crop stalks and chaff fine materials enter. It also has a rear exit 46 where chopped materials exit. To aid in spreading the exiting crop materials evenly across the field, vanes 47 are attached to the rear end of the combine body 12 near the rear exit 46. The vanes 47 are angled outwardly so that the crop materials which exit the system 40 are redirected to cover a wide swath pattern. Optimally, the width of the swath pattern is equal to the width of the header assembly (not shown) attached to the feeder assembly 20 at the front of the combine.

To spread the crop materials over a swath of this width, the crop materials have to contact the vanes 47 at a high velocity. In order to achieve this high velocity, a large amount of air flow must be driven at a high speed through the housing 42. The system 40 of the present invention accelerates the stream of air received from the cleaning fan 34 so as to produce an air flow speed of up to sixty miles per hour at the exit 46.

Figure 3:
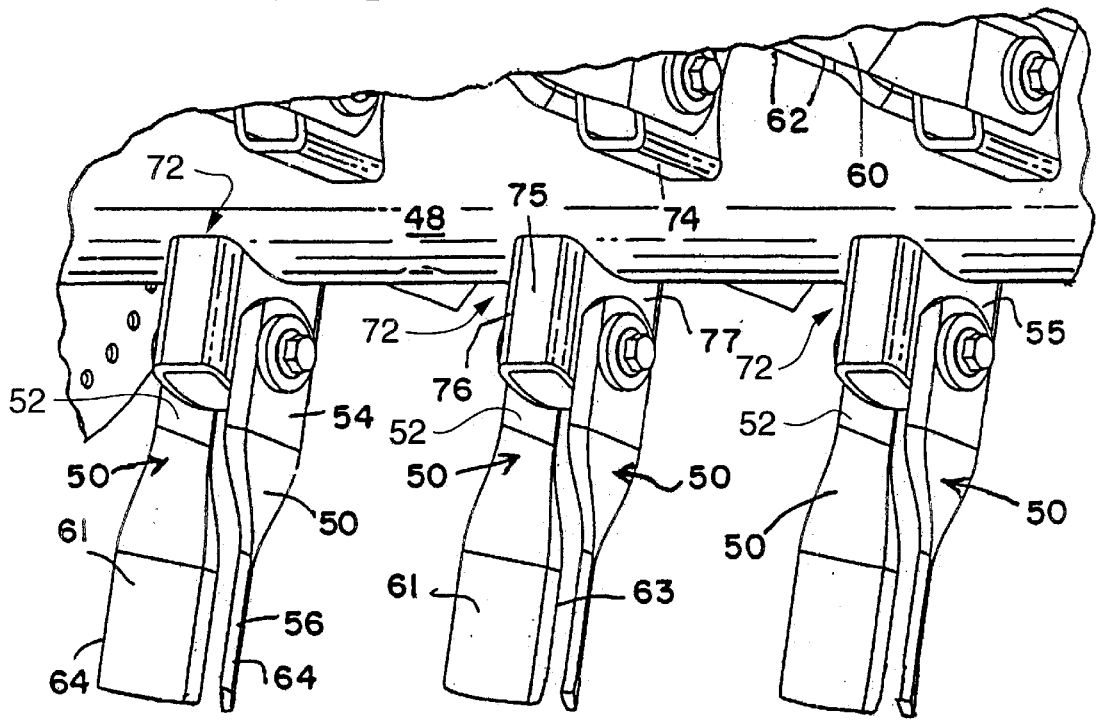
FIG. 3 is a perspective view of a portion of the hub and blade assembly in the straw chopper of FIG. 2.

Referring now to FIG. 3, in the hub assembly 49 a plurality of flail blades 50 are pivotally attached to a hub 48 in pairs 51, arranged in a row spaced along the length of the hub 48. In turn, four such rows are displaced 90° from each other around the hub 48. Drive means (not shown), which are well known to those skilled in the art, rotate the assembly 49.

Referring additionally to FIGS. 4 and 5, each flail blade 50 includes a flat inner mounting portion 54 lying in the plane of blade rotation, which is transverse to the axis of the hub 48 ("inner" and "outer" being relative to the connection of the flail blade with the mounting point with the mounting post). The outer portion 56 of the flail blade 50 is angled away from the plane of rotation of the blade. The blades 50 are pivotally connected to the hub 48 in a manner hereinafter discussed.

A preferred method of manufacturing the flail blade 50 is by bending a single piece of metal so that an intermediate portion 58 is bent in a smooth transition between the outer portion 56 and the inner portion 54. In the illustrated blade, 50, the outer portion 56 is flat, both longitudinally and transversely. Therefore, as the hub 48 rotates each radial line along its forward surface 60 travels along a different plane.

Although the invention envisions employing a variety of blade 50 angles, a preferred configuration has a flat outer portion 56 which is angled five degrees from the plane of blade rotation so that its projected frontal area is twelve millimeters wide. In an alternative configuration, the flat outer portion 56 is angled thirty-five degrees from the plane of blade rotation so that its projected frontal area is twenty-four millimeters wide. The specific angle of the outer portion 56 in a flail blade can be tailored to optimize the cutting action, i.e. fine or coarse, and the effect on exiting air flow velocity of the system 40.

The flail blades 50 are preferably attached to the hub 48 in mated pairs 51, as has been pointed out. In the arrangement seen in FIGS. 3–5, the leading edges 62 of the outer portions 56 on mated flail blades are relatively close to each other. The trailing edges 64 of the outer portions 56 on the mated blades, on the other hand, are relatively further from each other. A V-shape pocket is formed between, and behind, the outer portions 56 of the mated blades.

As the hub 48 rotates, the forward surfaces 60 of the outer portions 56 compress the air in front of the blades 50, driving air forward. Also, a pressure drop is created in the pocket formed behind the rear surfaces 61 of the outer portions 56 of each pair of blades 50, causing the rotating blades to draw air from the rear.

Referring to FIG. 2, attached to the base of the housing 42, in fixed relationship, are a series of knives 43 (only one shown). The knives 43 extend upwardly, inside the housing 42, between mated pairs of flail blades 50. A scissor-like cutting action results as each flail blade 50 passes by a knife 43. The cutting action chops the crop materials into a finer residue.

The knife blades 43 are all mounted in one, downwardly removable cassette (not shown). The number of knife blades 43, and their placement, can then be easily changed, based on the angle and width of the flail blades 50, in order to achieve a variety of fine or coarse cutting actions.

Preferably, the leading edge 62 of each flail blade 50 is sharpened, as at 63, to enhance the scissor action. This is accomplished by relieving the leading edge 62 to a surface that it lies in the plane of blade 50 rotation, or is angled from this plane, so that this surface actually undercuts the forward surface 60.

The blade 50 mounting support includes a mounting post 72 for each pair of blades 50 fixed to the hub 48. Each post 72 comprises a rectangular cross-section tube extending radially away from the hub 48. Each tube includes front and back walls 74 and 75, and left and right side walls 76 and 77. The outside width of the tube in each mounting post 72 is substantially the same as the desired distance between the mounting surfaces 52 of a mated pair of flail blades 50. Thus, the mounting surfaces 52 of the flail blades 50 seat flush against the exterior surfaces of the side walls 76 and 77.

Referring to FIG. 6, as well as FIG. 5, the mated pair of blades 50 are pivotally mounted on the support post 72 with a hollow pin 78. The pin 78 extends through the inner portions 54 of the flail blades 50 and the mounting support side walls 76 and 77. The pin 78 has a cap 79 at one end and an internally threaded bore 80 extending into the other end. A bolt 81 having a head 82 and a threaded shaft 83 is inserted through a washer 84 into the bore 80. The threaded shaft 83 is received in the threaded bore 80. The bolt 81 can easily be tightened with a wrench, acting on the head 82.

In order to provide maximum contact area between the flail blade 50 and the mounting support 72, and to allow pivoting clearance between the inner portion 54 of the flail blade and the hub 48, the innermost edge of the flail blade is formed in a segmentally circular shape around the pivot axis of the bolt 78. This is best seen in FIG. 4.

The flail blades 50 are more accurately positioned in the present invention because spacer bushings, which are commonly used in prior art systems, are not required. Additionally, a greater area of surface contact and, thus, support is possible between the flail blade mounting surface and the mounting support side walls 76 and 77. Because the flail blades are positioned more accurately, a more effective scissor action is made possible because each knife 43 may be positioned closer to the spaced flail blades 50 than is possible with prior art mounting systems. The tubular configuration of the mounting post 72 is also stronger than the simple tang mounts prevalent in the prior art. Therefore, the mounting post 72 can better resist fatigue stresses, stresses that cause tang mounts to break.

In the first form of blade assembly 49 which has been described, the leading edges 62 of mated blades 50 are relatively close to each other while the trailing edges 64 are relatively further apart. In a second form of blade assembly, seen in FIG. 7, just the opposite is true. In this form, the trailing edges 164 of mated blades 150 are relatively close to each other while the leading edges 162 are relatively further apart.

In a third form of hub and blade assembly 249 embodying features of the present invention, as seen in FIG. 8, the leading edges 262 and trailing edges 264 of the mated blades 250 are equidistant from each other. The outer portions 256 of each blade 250 in a mated pair are angled at anywhere between five degrees and thirty-five degrees from a plane transverse to the axis of rotation of the hub 248.

Referring now to FIG. 9, another hub and blade assembly 349 embodying features of the invention is illustrated. The assembly 349 utilizes a combination of blade forms which produce a particularly advantageous result; serving both to enhance air flow through the chopper housing and the spreading of exiting crop materials across the field.

As seen in FIG. 9, the hub and blade assembly 349 includes a hub 348. Six rows of mated pairs of blades 350 are mounted on the hub 348 (60° displaced from each other). Each row contains five evenly spaced pairs 351 of blades 350.

Each row of blade pairs 351 also includes three different blade 350 arrangements, 350A, 350B and 350C. In FIG. 9 in the uppermost blade row illustrated, each blade pair 351A is constructed and arranged according to the first form of the invention. The blade pair 351 B is constructed and arranged according to one variation of the third form of the invention. Each blade pair 351C is constructed and arranged according to another variation of the third form of the invention.

Insofar as variations of the third. form of blade pairs 351B and 351C are concerned, it will be seen that the variation resides in the direction of inclination of the outer portions 356 of blades 350 in question. The blades 350 in the pairs 351B have both outer blade portions 356 inclined (in the same direction) so as to drive air axially outwardly of the hub 38, as well as rearwardly. Similarly, the blades 350 in the pairs 351C have outer blade portions 356 inclined (in the same direction) so as to drive air axially outwardly, as well as rearwardly.

Each row of blade pairs 351 has at least one, and sometimes as many as three, pairs 351A (the pairs 351 are staggered in different rows). Each has, in addition, at least one pair 351 each of 350B and 350C blade configurations. The effect of this construction is to effect a powerful rearward and laterally outward flow of air from the system 40. Spreading of crop material is further enhanced by this arrangement.

While a preferred embodiment of the invention has been described, it should be understood that the invention is not so limited, and modifications may be made without departing from the invention. The scope of the invention is defined by the appended claims, and all devices that come within the meaning of the claims, either literally or by equivalence, are intended to be embraced therein.

What is claimed is:

1. In a residue handling, system for an agricultural combine, the improvement in a residue chopper comprising:
   a housing having an inlet and an outlet, and a hub and blade assembly mounted for rotation in said housing in a first plane parallel to the direction of rotation, said hub having a peripherally cylinder-like surface with a longitudinal axis generally perpendicular to said first plane;
   a plurality of mounting posts affixed generally symmetrically to said peripheral cylinder-like surface along and around the longitudinal axis thereof and extending radially therefrom;
   a pair of elongated chopper blades pivotally affixed to each said mounting post, each said chopper blade further having an inner flat portion, an outer end portion and an intermediate portion, said outer portion including a front face and a rear face extending substantially parallel to each other and lying at an angle to said first plane, and said intermediate portion bent in a smooth transition between said inner and outer portions such that said front face is inclined at an angle to said first plane and said inner portion lies in said first plane;
   said outer portion of each chopper blade has a sharpened leading edge and a trailing edge relative to said direction of rotation;
   said leading edges of said outer portions in at least some of said pairs of chopper blades are closer together than said leading edges; and
   a plurality of knives are mounted in said housing and extending radially toward said hub such that a knife extends into the path of rotation and between each pair of chopper blades.

2. The residue chopper of claim 1, wherein:
   said pairs of chopper blades affixed to said hub are arranged in three patterns along the axial dimension thereof as follows:
   a first pattern in the middle section of said hub characterized in that said trailing edges of said outer portions of said pairs of chopper blades are closer together than said leading edges;
   a second pattern on a first end section of said hub adjacent said middle section characterized in that said leading edges and said trailing edges of said outer portions of each said pair of chopper blades are substantially equidistant from each other, and said front face of each said chopper blade is inclined away from said middle section; and
   a third pattern on a second end section of said hub adjacent said middle section, on the opposite end of said hub from said first end section, characterized in that said leading edges and said trailing edges of said outer portions of each said pair of chopper blades are substantially equidistant from each other, and said front face of each said chopper blade is inclined away from said middle section.

3. The residue chopper of claim 2, wherein:
   each said mounting post comprises an open-centered generally rectangular stub tube with generally planar outside walls generally parallel to said first plane, and a first opening through said outside walls;
   each said chopper blade has a second opening therethrough to match said first opening and by which said chopper blade is affixed to respective said mounting posts;
   the inner portion of each said chopper blade being flat and parallel to said first plane and seated flush, with a sliding relationship against one of said generally planar outside walls; and
   a fastener extending through said first and second openings to affix said pair of chopper blades to respective said mounting posts.

4. The residue chopper of claim 3, wherein:
   said face of each said chopper blade is inclined at an angle of five degrees from said first plane.

5. The residue chopper of claim 3, wherein:
   said face of each said chopper blade is inclined at an angle of thirty-five degrees from said first plane.

6. In an agricultural combine including a wheel-supported frame, a crop gathering mechanism supported on said frame and adapted to remove crop from the field, a crop threshing mechanism supported on said frame, a crop feeder mechanism interconnecting said crop gathering mechanism and said crop threshing mechanism, a crop residue handling mechanism supported on said frame and adapted to receive crop residue from said crop threshing mechanism, chop it into finer pieces, and spread it on the field, and an engine supported on said frame and adapted to provide motive power to the combine and the various mechanisms supported thereon, the improvement in said crop residue handling mechanism comprising:
   a housing having an inlet and an outlet, and a hub and blade assembly mounted for rotation in said housing in a first plane parallel to the direction of rotation, said hub having a peripherally cylinder-like surface with a longitudinal axis generally perpendicular to said first plane;
   a plurality of mounting posts affixed generally symmetrically to said peripheral cylinder-like surface along and around the longitudinal axis thereof and extending radially therefrom;
   a pair of elongated chopper blades pivotally affixed to each said mounting post, each said chopper blade further having an inner flat portion, an outer end portion and an intermediate portion, said outer portion including a front face and a rear face extending substantially parallel to each other and lying at an angle to said first plane, and said intermediate portion bent in a smooth transition between said inner and outer portions such that said front face is inclined at an angle to said first plane and said inner portion lies in said first plane;

said outer portion of each chopper blade has a sharpened leading edge and a trailing edge relative to said direction of rotation;

said leading edges of said outer portions in at least some of said pairs of chopper blades are closer together than said leading edges; and a plurality of knives are mounted in said housing and extending radially toward said hub such that a knife extends into the path of rotation and between each pair of chopper blades.

7. The residue chopper of claim 6, wherein:

said pairs of chopper blades affixed to said hub are arranged in three patterns along the axial dimension thereof as follows:
  a first pattern in the middle section of said hub characterized in that said trailing edges of said outer portions of said pairs of chopper blades are closer together than said leading edges;
  a second pattern on a first end section of said hub adjacent said middle section characterized in that said leading edges and said trailing edges of said outer portions of each said pair of chopper blades are substantially equidistant from each other, and said front face of each said chopper blade is inclined away from said middle section; and
  a third pattern on a second end section of said hub adjacent said middle section, on the opposite end of said hub from said first end section, characterized in that said leading edges and said trailing edges of said outer portions of each said pair of chopper blades are substantially equidistant from each other, and said front face of each said chopper blade is inclined away from said middle section.

8. The residue chopper of claim 6, wherein:

each said mounting post comprises an open-centered generally rectangular stub tube with generally planar outside walls generally parallel to said first plane, and a first opening through said outside walls;

each said chopper blade has a second opening therethrough to match said first opening and by which said chopper blade is affixed to respective said mounting posts;

the inner portion of each said chopper blade being flat and parallel to said first plane and seated flush, with a sliding relationship against one of said generally planar outside walls; and a fastener extending through said first and second openings to affix said pair of chopper blades to respective said mounting posts.

9. The residue chopper of claim 7, wherein:

said face of each said chopper blade is inclined at an angle of five degrees from said first plane.

10. The residue chopper of claim 7, wherein:

said face of each said chopper blade is inclined at an angle of thirty-five degrees from said first plane.

* * * * *